Oct. 31, 1950     T. K. CROSSLAND     2,528,039
MAGNETIC CLUTCH CONTROL MEANS FOR COASTER BRAKES
Filed March 21, 1947
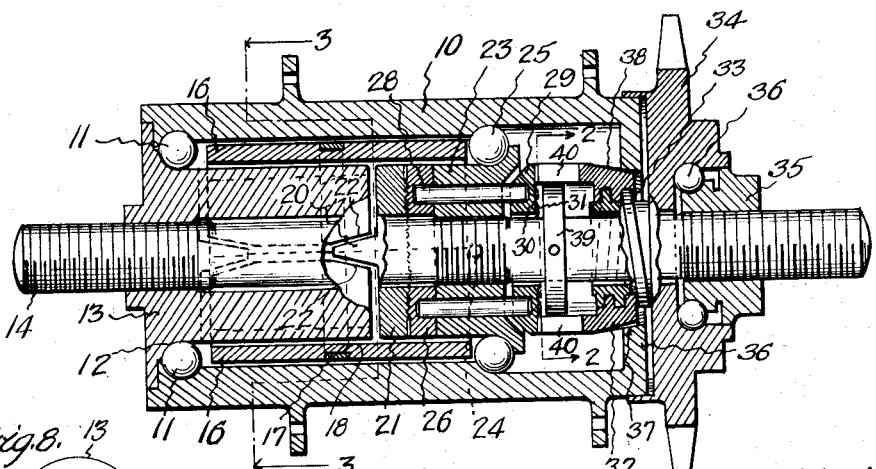
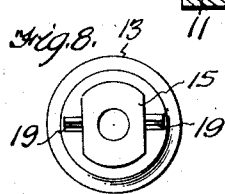
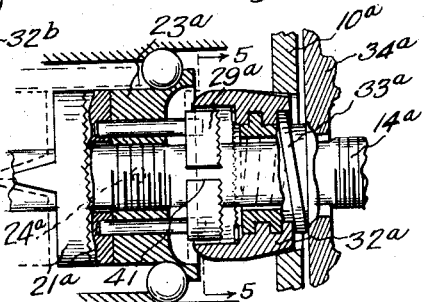
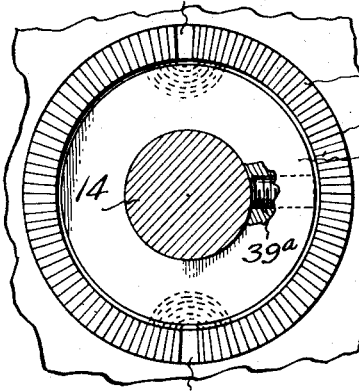
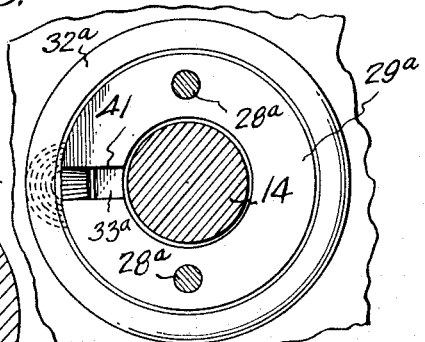
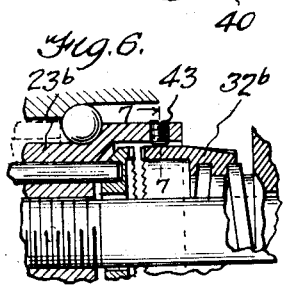
INVENTOR.
THEODORE K. CROSSLAND
BY
*Irving S. McCathran*
HIS ATTY.

Patented Oct. 31, 1950

2,528,039

UNITED STATES PATENT OFFICE 2,528,039

MAGNETIC CLUTCH CONTROL MEANS FOR COASTER BRAKES

Theodore K. Crossland, Hialeah, Fla.

Application March 21, 1947, Serial No. 736,298

1 Claim. (Cl. 192—6)

This invention relates to a coaster brake, and has for one of its objects the production of a simple and efficient means for holding the clutch member of a coaster brake against turning movement relative to the supporting axle when the clutch member is in an intermediate position relative to the driving means and the brake-applying means of the coaster brake.

A further object of this invention is the production of an efficient magnetic means for holding the clutch member of a coaster brake against turning movement or rotation relative to its supporting axle when the clutch member is in an intermediate position relative to the driving means and the brake-applying means of a coaster brake.

Other objects and advantages of the present invention will appear throughout the following specification and claim.

In the drawing:

Figure 1 is a longitudinal sectional view of the coaster brake;

Figure 2 is an irregular sectional view taken on line 2—2 of Figure 1;

Figure 3 is an enlarged sectional view taken on line 3—3 of Figure 1, illustrating the lines of magnetic flux applied to one form of the invention;

Figure 4 is a fragmentary longitudinal sectional view illustrating a modified form of the invention;

Figure 5 is an enlarged sectional view taken on line 5—5 of Figure 4 illustrating the lines of magnetic flux as applied to the form of invention shown in Figure 3;

Figure 6 is a fragmentary longitudinal sectional view illustrating a further modified form of the invention;

Figure 7 is an enlarged sectional view taken on line 7—7 of Figure 6 illustrating the lines of magnetic flux as applied to the form of invention shown in Figure 6;

Figure 8 is an end elevational view reduced in size of the fixed brake shoe supporting member.

This application constitutes a continuation in part of my previous application relating to a Coaster Brake, filed December 31, 1946, Patent Number 2,493,227, and relates more specifically to the magnetic means for holding the clutch member against turning movement upon its supporting axle while the clutch member is in an intermediate non-engaging position relative to the driving means and the driven means of the coaster brake. By referring to the drawing, it will be seen that 10 designates the wheel hub or spool which is rotatably supported at one end upon the bearings 11, which bearings are carried by the race 12 of the fixed brake shoe supporting member 13. The member 13 is preferably threaded upon the shaft or axle 14, as shown in Figure 1. The member 13 is provided with an inwardly extending core 15 which is substantially rectangular in its transverse area, as shown in Figure 2. A pair of brake shoes 16 are carried by the core 15 and are adapted to expand radially of the member 13. A suitable split spring band 17 fitting in the channels 18 of the shoes 16 holds the shoes normally contracted. The member 13 is provided with a wedge-shaped lug 19 upon each side of the core 15, as shown in Figure 8, for contacting the shoes 16 and causing the shoes 16 to expand as the wedge-shaped lugs 20 of the brake wedge disc 21 engages the beveled faces 22 of the brake shoes 16. The disc 21 is slidable toward and away from the shoes 16 to move the lugs 20 into and out of a brake shoe actuating position, and to move the shoes into engagement with the inner face of the hub or spool 10. The opposite face of the disc 21 is preferably serrated for contact with the disc 26 which is preferably similarly serrated upon its abutting face which contacts the disc 21—see Figure 1.

A bearing cone 23 is fixed on the shaft or axle 14, by being threaded thereon and locked by a suitable set screw 24 shown in dotted lines in Figure 1. The cone 23 supports the bearings 25 which in turn rotatably support the hub 10 near the opposite end relative to the bearings 11 above mentioned. The disc 26 is slidable on the shaft or axle 14 and is carried by the inner ends of the pins 28, which pins are slidable through the bearing cone 23. The opposite ends of the pins 28 are secured to the clutch-disc 29. The disc 29 is provided with a serrated face 30, which face 30 is adapted to be contacted by the serrated face 31 of the worm nut or floating clutch member 32.

The worm nut or clutch member 32 is threaded upon the worm thread 33, carried by the hub extension of the driving sprocket 34 for longitudinal movement thereon. This worm nut or clutch member 32 is magnetized, as set forth in detail in the following description, and thereby eliminates the conventional spring. The driving sprocket 34 is carried by the bearing nut 35 which is threaded upon the axle 14 and suitable ball-bearings 36 are interposed between the driving sprocket 34 and the nut 35, to support the sprocket 34. The adjustable nut 35 is of the conventional type. The hub or spool 10 is provided with an end wall 36 having a central aperture 37 which tapers inwardly toward its center and in the direction of the sprocket 34. The clutch member 32 is provided with a tapering or inclined serrated face 38 which is adapted to provide wedging engagement within the aperture 37 to drive the spool or hub 10 from the hub extension of the driving sprocket 34 and limit movement of the clutch member in one direction. An anchored disc 39 is fitted to the shaft or axle 14 by a set screw 39a, and fits within the clutch member 32, as shown in Figure 1, and for the purpose described in the following.

It should be noted that as the drive sprocket 34 is driven in one direction the worm thread 33 will draw the clutch member 32 firmly in wedging engagement within the tapering aperture 37 for the purpose of rotating the hub or spool 10. As the direction of rotation of the sprocket 34 is reversed, the thread 33 will move the clutch member 32 out of engagement with and away from the tapering aperture 37 and into contact with the disc 29, thereby causing the pins 28 to force the disc 26 against the disc 21. This movement will force the wedges 29 against and between the beveled faces 22 of the brake shoes 16 and spread the brake shoes 16 apart into gripping action with the inner face of the hub 10, thereby applying a braking action to the hub or driven member 10. This is substantially the operation and construction set forth in my previous application above identified. The present application however, is directed specifically to the magnetic means for holding the clutch member 32 against turning or rotating movement relative to the axle when the clutch member is in an intermediate position relative to the driving means and the brake-applying means, which position will release the hub 10 for free coasting.

In the form shown in Figures 1 and 2, it will be noted that the clutch member 32 is shifted into gripping engagement with the wheel hub or spool 10 by the worm thread 33, as the sprocket 34 is rotated in one direction. The clutch member 32 is shifted into a brake shoe applying position by the worm thread 33, as the sprocket 34 is rotated in the opposite direction. Therefore, it is necessary to provide some means to hold the clutch member 32 against turning movement relative to the axle 14 as the thread 33 rotates to shift the clutch member 32 in order to insure longitudinal shifting movement of the clutch member 32 in selected opposite directions longitudinally of the axle 14. I have provided a very simple means for accomplishing this function by eliminating the conventional spring means and substituting therefor a magnetic means to hold the clutch member against turning movement when the clutch member is in an intermediate position and when the hub 10 is in a free coasting position. The clutch member 32 is provided with longitudinally extending slots 40 which slots are formed to extend inwardly from the serrated face 31 thereof. These slots 40 are preferably arranged diametrically opposite each other, as shown in Figure 2. The areas of the clutch 32 upon opposite sides of the slots 40 are magnetized and the magnetic lines of force or the flux will extend inwardly toward the disc 39 from one side of each slot toward the other side thereof in an inwardly curved manner, as shown in Figure 1. This magnetic force will therefore hold the clutch member 32 against turning movement relative to the axle 14 since the disc 39 is anchored to the axle 14. This magnetic force, however, is not sufficient to prevent the clutch member 32 from being shifted longitudinally from one position to the other or to retard this movement as the thread 33 rotates for shifting the clutch member 32 in the manner above described. Where the field strength of the magnetic force is sufficient, the disc 39 may be eliminated without departing from the spirit of the invention.

Many variations may be provided to anchor or hold the clutch member against turning movement, two other forms being shown in Figures 4 and 6. In Figure 4, a shaft 14a, similar to the shaft 14, is shown. The sprocket wheel 34a carries the threaded hub 35a and the clutch member 32a is shifted into and out of selected engagement with the wheel hub 10a and the disc 29a, which controls the brake-applying mechanism 21a, similar to that shown in Figure 1. This mechanism 21a is controlled by the pins 28a, which extend through the cone 23a and engage the disc 29a. In Figure 4, a bearing cone 23a of a slightly modified design is shown and the disc 29a is arranged to fit within the clutch member 32a. The cone 23a is anchored to the shaft 14a by means of a pin 24a. Suitable serrations are provided upon the disc 29a and the clutch 32a, as shown. The disc 29a, however, in this form is provided with a split portion 41. This disc 29a is magnetized adjacent the split portion 41, and the lines of magnetic force or flux are outwardly curved in a direction across the split portion 41 and against the inner face of the clutch member 32a, as shown in detail in Figure 5.

In Figure 6, there is shown a further form of the invention, whereby the bearing cone 23b is provided with an overhanging portion 42 which overhangs the clutch member 32b at all times. A magnetized threaded plug 43 extends transversely through the overhanging portion 42, as shown in Figures 6 and 7. The lines of magnetic force in this instance extend inwardly or in an inwardly curved direction toward the clutch member 32b from the plug 43—see Figure 7. Since the bearing cone 23b is anchored to the axle 14b by the pin 24b the clutch member 32b cannot turn upon the axle 14b while the clutch member is being shifted from one position to the other.

It should be understood that many variations may be made to accomplish the desired result by means of the use of magnetic force to anchor the clutch member against rotation when in an intermediate position, without departing from the spirit of the invention so long as these changes fall within the scope of the appended claim.

Having described the invention, what is claimed as new is:

A coaster brake of the class described comprising a fixed axle, a hub rotatably mounted thereon, a drive sprocket mounted at one end of the hub for rotation relative to the hub and axle, a drive member on the axle and fixed to the sprocket, a hollow floating clutch member threaded upon and surrounding said drive member for longitudinal movement relative thereto in response to relative rotation therebetween, said clutch member having an intermediate free coasting position for said hub, said clutch member having a longitudinal slotted portion, the area of the clutch member upon opposite sides of the slotted portion being magnetized, a disc fixed to said axle and fitted into said hollow floating clutch member, said disc having the periphery thereof in close proximity to said slotted portion of said clutch member and extending in a direction transversely of the slotted portion, the lines of magnetic force of the magnetized areas of the clutch extending toward the periphery of said disc in an inwardly curved manner to hold the clutch member against turning movement relative to the axle when the clutch member is in an intermediate position, means to limit the movement of said clutch member in one direction in response to forward turning movement of the sprocket and drive member and to effect clutching engagement between the clutch member and hub to drive the hub by said sprocket, a brake in said hub, and means to actuate said brake by movement of said clutch member in the opposite direction in response to a reverse turning movement of the sprocket and drive member relative to the axle.

THEODORE K. CROSSLAND.

REFERENCES CITED

The following references are of record in the file of this patent:

UNITED STATES PATENTS

| Number | Name | Date |
|---|---|---|
| 681,835 | Soldana | Sept. 3, 1901 |
| 817,305 | Duncan | Apr. 10, 1906 |
| 937,099 | Schulze | Oct. 19, 1909 |
| 1,018,471 | Zimmerman | Feb. 27, 1912 |
| 2,151,324 | Jordan | Mar. 21, 1939 |
| 2,291,486 | Musselman | July 28, 1942 |
| 2,303,041 | Glacy | Nov. 24, 1942 |

FOREIGN PATENTS

| Number | Country | Date |
|---|---|---|
| 434,729 | France | Dec. 5, 1911 |